US007016283B2

(12) United States Patent
Yang et al.

(10) Patent No.: US 7,016,283 B2
(45) Date of Patent: Mar. 21, 2006

(54) SPINDLE MOTOR INCLINATION ANGLE ADJUSTING MECHANISM FOR OPTICAL DISK DEVICES

(75) Inventors: Chih-Hsuan Yang, Hualien Hsien (TW); Chi-Shen Chang, Hsinchu (TW); Yu-Hsiu Chang, Changhua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 708 days.

(21) Appl. No.: 10/254,931

(22) Filed: Sep. 26, 2002

(65) Prior Publication Data

US 2004/0022154 A1    Feb. 5, 2004

(30) Foreign Application Priority Data

Jul. 31, 2002  (TW) .............................. 91117112 A

(51) Int. Cl.
 *G11B 7/00*    (2006.01)
(52) U.S. Cl. ............... 369/53.3; 369/44.32; 369/53.19; 369/264
(58) Field of Classification Search ............ 369/44.32, 369/53.19, 53.3, 264, 53.12; 720/700
See application file for complete search history.

(56) References Cited

U.S. PATENT DOCUMENTS 6,236,636 B1    5/2001  Ogusu
6,388,982 B1 *  5/2002  Ogusu ........................ 369/264

* cited by examiner

*Primary Examiner*—Nabil Hindi
(74) *Attorney, Agent, or Firm*—Birch, Stewart, Kolasch & Birch, LLP

(57) ABSTRACT

A spindle motor inclination angle adjusting mechanism for an optical disk device includes two adjusting mechanisms to provide two rotational freedom for the base dock of the spindle motor to adjust the inclination angle of the spindle motor. The first adjusting mechanism has three support points that are not on the same straight line to support the base dock. Two of the support points are fixed and the third support point is movable relative to the other two support points to change the inclination angle of the base dock of the spindle motor. The second adjusting mechanism is a rotary element for carrying the first adjusting mechanism and driving the first adjusting mechanism to rotate and change the direction of the inclination angle of the base dock to adjust the spindle motor inclination angle.

13 Claims, 7 Drawing Sheets

SPINDLE MOTOR INCLINATION ANGLE ADJUSTING MECHANISM FOR OPTICAL DISK DEVICES

FIELD OF THE INVENTION

The invention relates to a spindle motor inclination angle adjusting mechanism, and particularly a spindle motor inclination angle adjusting mechanism for optical disk devices.

BACKGROUND OF THE INVENTION

Optical disk devices are highly developed information products that are widely used. They are available in many different forms such as CD-ROM, DVD-ROM and the like.

Optical disk devices have spindle motors which must be positioned precisely to keep the data carrying surface of the optical disc (CD or DVD) normal to the optical axis of the objective lens of the optical pick-up head in order to facilitate data reading and retrieval.

Conventional inclination angle adjusting mechanisms for optical disk devices can be grouped into the guide rod adjusting type that adjusts the position of a guide rod, and the spindle motor adjusting type that adjusts the spindle motor inclination angle. The guide rod adjusting type has the advantage of a smaller space in the axial direction of the spindle motor, but its drawback is the need for a longer adjusting time. The spindle motor adjusting type requires a larger space in the axial direction of the spindle motor, but can be adjusted in less time, thus is more suitable for fast assembly and adjustment in production.

In principle, to adjust the spindle motor inclination angle requires only two rotational freedom for the spindle motor. U.S. Pat. No. 6,236,636, entitled: "Spindle motor inclination angle adjusting mechanism in optical disk apparatus", discloses a spindle motor inclination angle adjusting technique which employs three support points that are not on the same straight line to support the base dock of the spindle motor. One of the support points is fixed and serves as the fulcrum for adjusting the inclination angle. Other two support points use screws to support the base dock of the spindle motor. Adjusting the inclined angle of the base dock is accomplished by turning the two screws. When one screw is turned, the line linked between the other screw and the fulcrum becomes the rotational axis of the base dock of the spindle motor. By turning the two screws, the base dock of the spindle motor may be turned about two rotational axes to adjust the spindle motor inclination angle.

Using turning screws to adjust the spindle motor inclination angle tends to cause too large of the inclination angle at the initial installation time due to deviations of the screw positions. Using the collimator to determine the inclination angle cannot obtain the calibrating direction and results in increased calibration time, or even makes calibration impossible.

SUMMARY OF THE INVENTION

The primary object of the invention is to provide a simple mechanism to achieve the following functions and benefits:
1. The components of the mechanism are precisely made to enable the inclination angle to reach a selected adjusting range, and the adjusting mechanism only takes care of fine-tune adjustment for the inclination angle.
2. Reduction in time required to adjust the inclination angle.
3. An adjusting mechanism is provided that can enhance adjusting precision.

The technique provided by the invention includes two adjusting mechanisms to accomplish the object set forth above. These two adjusting mechanisms provide rotational freedom. The first adjusting mechanism has three support points that are not on a straight line. Two of the support points are fixed. The third support point is movable relative to the other two support points, thereby the spindle motor inclination angle can be changed.

The second adjusting mechanism is a rotary element to carry a three-point support bracket and drives the three-point support bracket to rotate on a fixed location, thereby providing the spindle motor inclination angle another rotational freedom.

The two adjusting mechanisms are arranged in a stacked manner, and are located below the base dock of the spindle motor.

The first adjusting mechanism has three support points to support the base dock of the spindle motor. The elevation of one of the three support points may be adjusted relative to the other two support points. The two fixed support points serve as the fulcrum for the base dock, and the line linking the two fixed support points becomes an axis. Under the driving of the movable support point, the base dock may be turned about the axis and incline (for the supported surface).

The second adjusting mechanism drives the first adjusting mechanism to rotate on the location where it is installed. By changing the angle between the three support points and the spindle motor axis, the inclination angle and the direction of the spindle motor axis may be adjusted freely.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 2:
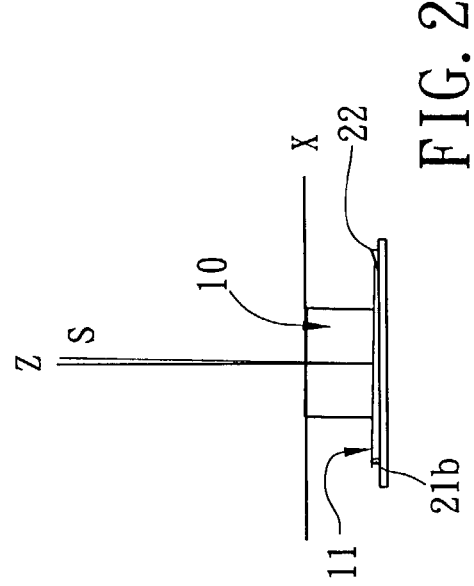
FIG. 2 is a schematic view of adjusting the spindle motor inclination angle through the second adjusting mechanism.
Figure 1:
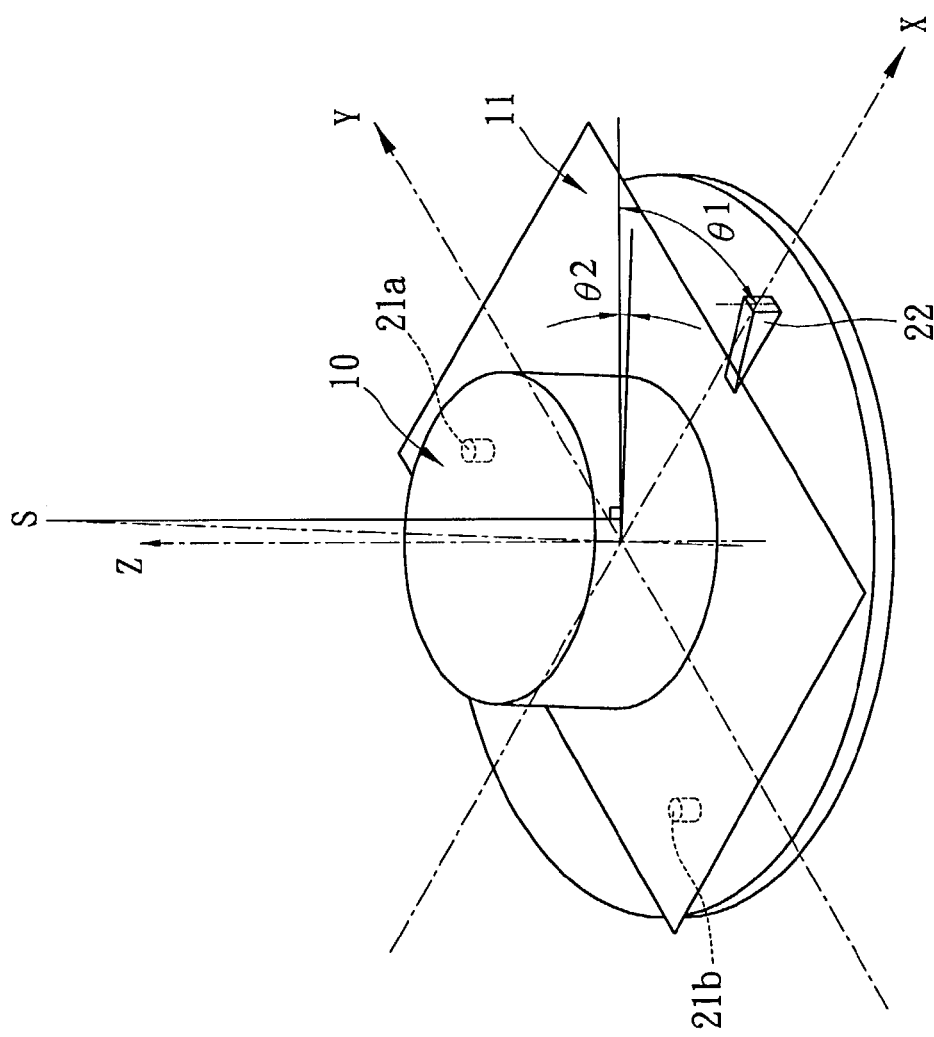
FIG. 1 is a schematic view of an equivalent effect mechanism of the invention.

Referring to FIGS. 1 and 2, a spindle motor 10 is installed on a base dock 11. The inclination angle adjusting mechanism A of the invention is located beneath the base dock 11, and includes a first adjusting mechanism and a second adjusting mechanism stacking with each other to support the base dock 11. By changing the inclination angle of the base dock 11 relative to a plane defined by X-Y coordinates, the inclination angle of the spindle motor 10 may be adjusted. The first adjusting mechanism has three support points 21a, 21b and 22 that are not on the same straight line and are in contact with the bottom side of the base dock 11. The first support point 21a and the second support point 21b are fixed. The third support point 22 is movable relative to the other two support points 21a and 21b, thereby changing the inclination angle of the base dock 11 of the spindle motor 10.

When the spindle motor 10 is not inclined, the axis of the spindle motor 10 is equal to the vertical Z axis of the coordinates. The base dock 11 is located on the plane defined by the X-Y axes of the coordinates. If the S axis of the spindle motor 10 inclines slightly at an inclination angle $\theta1$, as shown in FIG. 1, and the projecting direction of the S axis of the spindle motor 10 on the X-Y plane and the X coordinate in the positive direction form an angle $\theta2$, by changing the relative position between the third support point 22 and the other two support points 21a and 21b, the base dock 11 may be turned in a reverse direction at an angle of $\theta1$, and the spindle motor 10 may be moved back to the correct position (as shown in FIG. 2). If the third support point 22 is moved only in the direction of the X coordinate, because of the angle $\theta2$, the result mentioned above cannot be achieved by merely moving the third support point 22.

Therefore the three support points 21a, 21b and 22 of the first adjusting mechanism are carried by the second adjusting mechanism. The second adjusting mechanism basically is a rotary means for supporting the three support points 21a, 21b and 22 that drives the three support points 21a, 21b and 22 to rotate about the Z coordinate. Hence by turning the third support point 22 at an angle of $\theta2$ towards the projecting position of the S axis on the X-Y plane, and coupling with the third support point 22 of the first adjusting mechanism, the inclination angle of the spindle motor 10 may be adjusted as desired.

Figure 3:
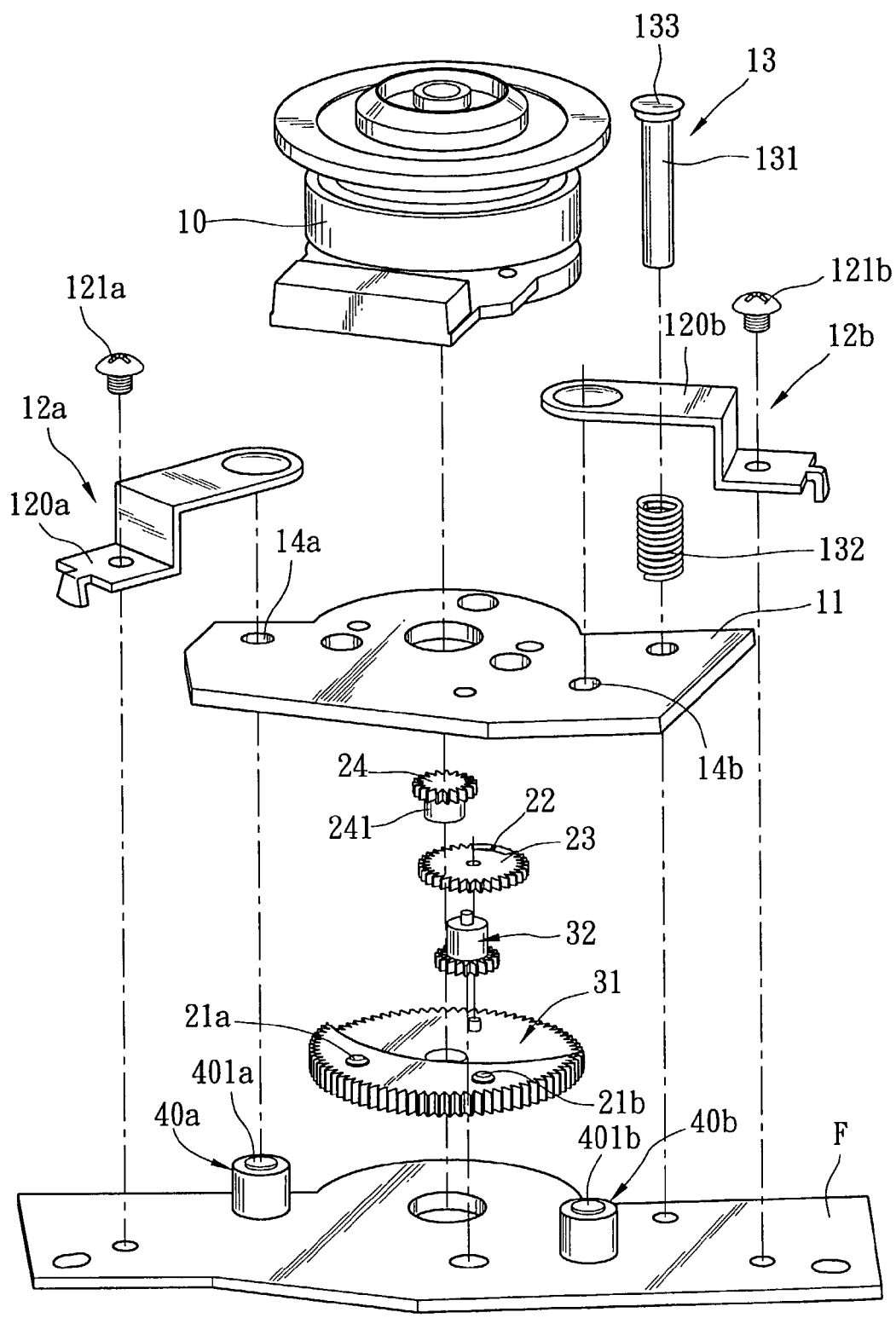
FIG. 3 is an exploded view of a first embodiment of the invention.
Figure 4:
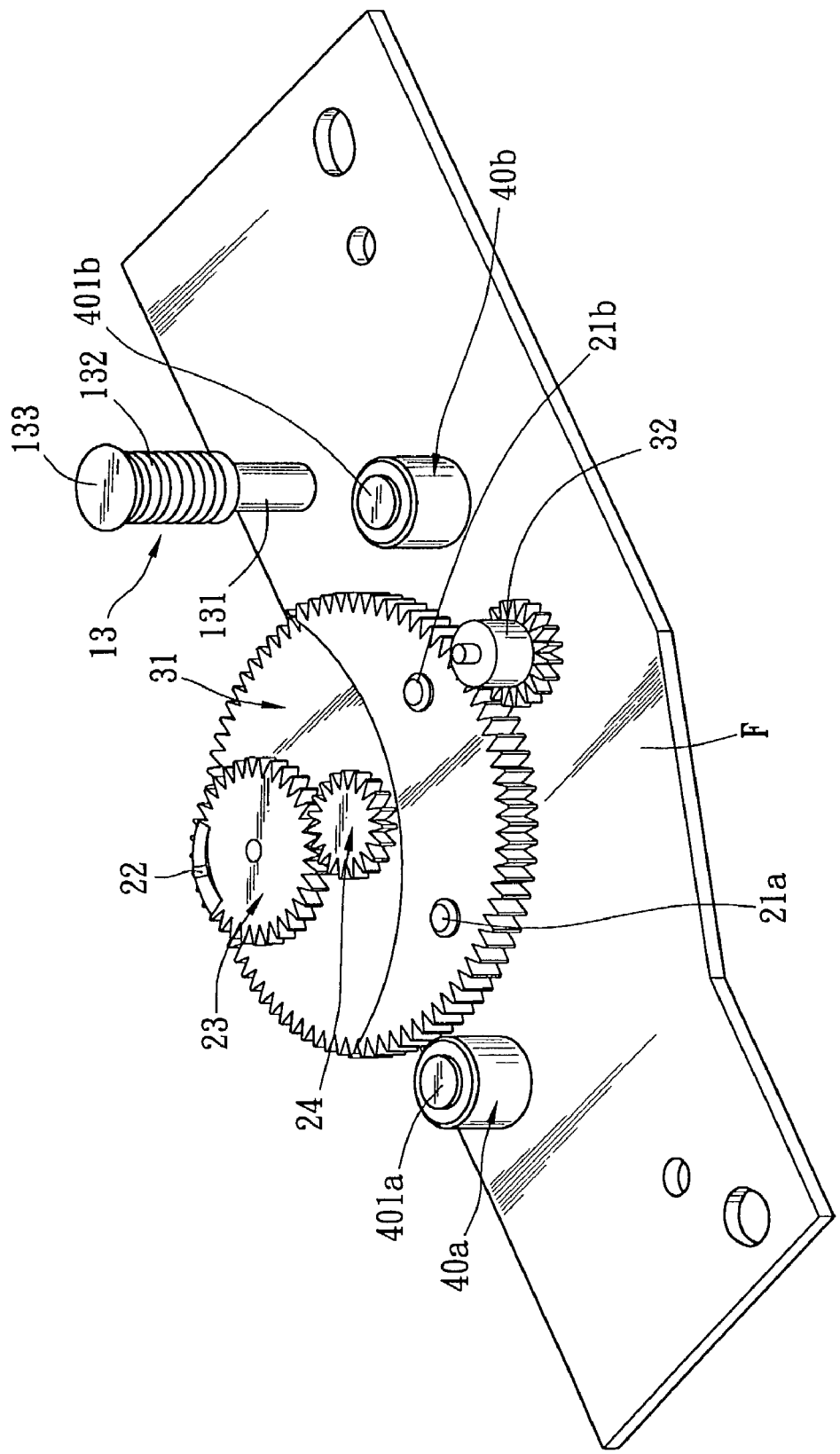
FIG. 4 is a fragmentary perspective view of the first embodiment of the invention.
Figure 5:
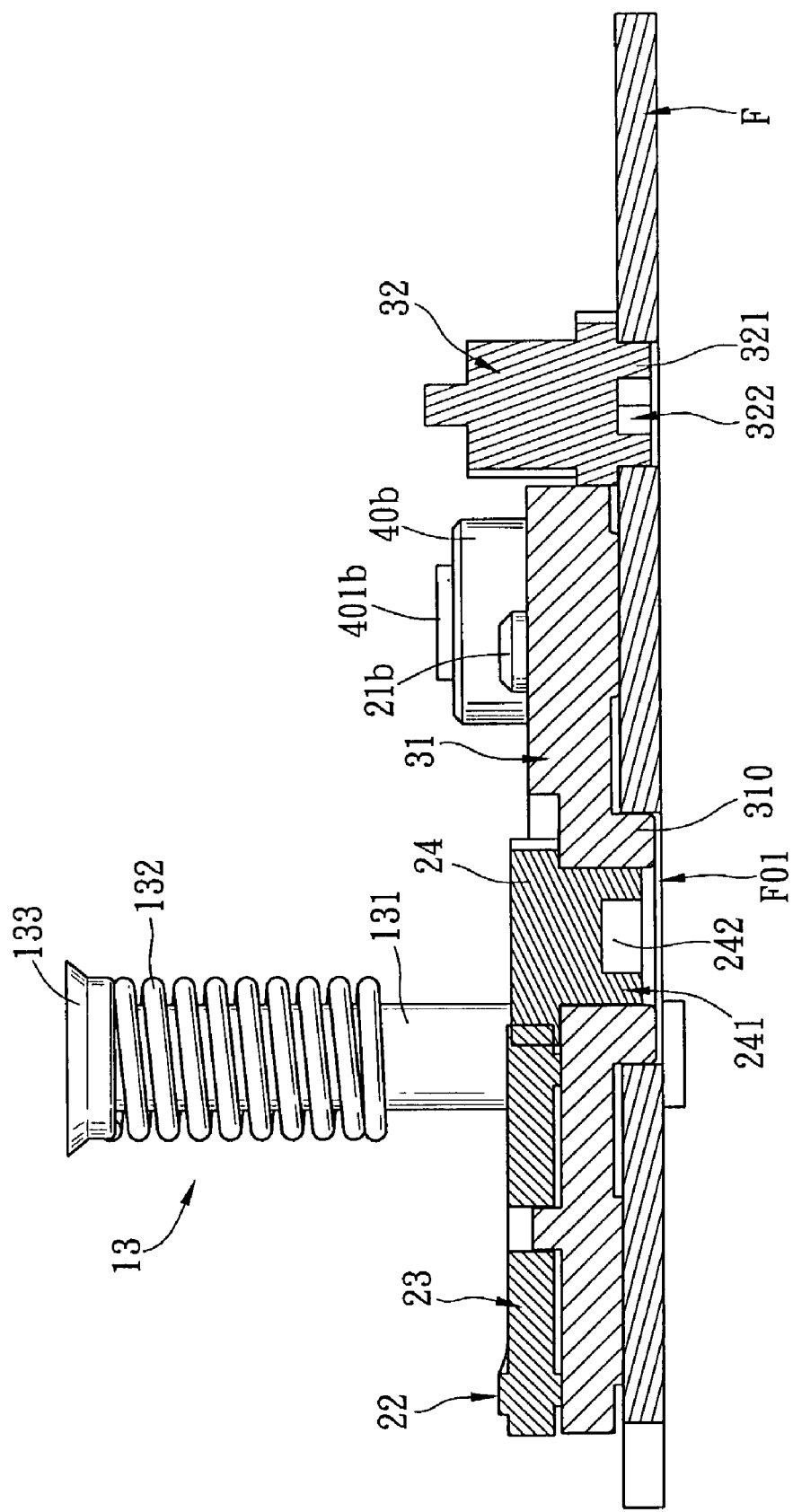
FIG. 5 is a fragmentary cross section of the first embodiment of the invention.

First Embodiment:

Refer to FIGS. 3 and 4 for the first embodiment of the invention. The second adjusting mechanism includes a first rotary element 31 and a second rotary element 32, which drives the first element 31 to rotate. The first and the second rotary elements 31 and 32 are pivotally located on a frame F of an optical disk device. The first rotary element 31 and the second rotary element 32 are spur gears and engage with each other. The secondary rotary element 32 has a main shaft 321 exposed outside to form a second fast connection head 322 (as shown in FIG. 5) to receive force to turn the first rotary element 31. The second fast connection head 322 is preferably a hexagonal socket or a cross groove socket that can be turned with a screw-driver.

The fixed first and second support points 21a and 21b are located on the surface of the first rotary element 31. The third rotary support point 22 is located on an eccentric location of a driven rotary element 23. The driven rotary element 23 is a spur gear and is pivotally mounted on an eccentric location of the rotary plane of the first rotary element 31. None of the three support points 21a, 21b and 22 are located at the rotation center of the first rotary element 31. The first rotary element 31 has a rotation shaft 310, which is a hollow tube housed in a shaft opening F01 formed on the frame F. There is a main driving rotary element 24 formed in a spur gear coaxial with the rotation shaft 310 to engage with the driven rotary element 23. The main driving rotary element 24 has a rotary shaft 241 housed in the hollow rotation shaft 310 (as shown in FIG. 5) and may rotate freely therein. The rotary shaft 241 has a bottom end exposed outside to form a first fast connection head 242 (as shown in FIG. 5) to receive force to drive the driven rotary element 23. The first fast connection head 242 is preferably a hexagonal socket or a cross groove socket that can be turned with a screw-driver.

Figure 6A:
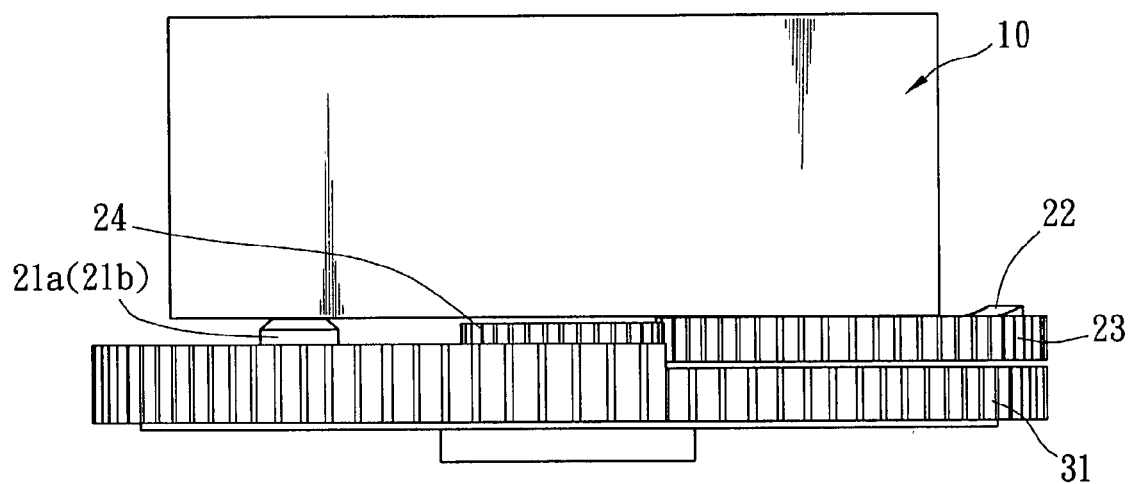
FIGS. 6A and 6B are schematic views of the first adjusting mechanism in operation.
Figure 6B:
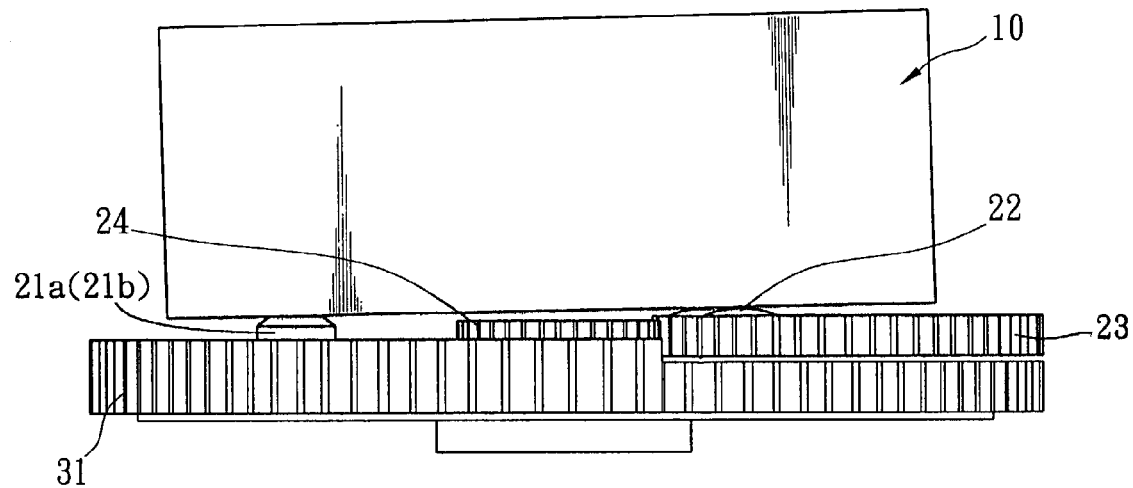

The base dock 11 of the spindle motor 10 is located above the three support points 21a, 21b and 22. The height of the third support point 22 is different from the height of the other two support points 21a and 21b, and preferably it is greater. When the main driving rotary element 24 rotates, the driven rotary element 23 is turned to move the third support point 22. As a result, the relative position between the third support point 22 and the other two support points 21a and 21b is changed (referring to FIGS. 6A and 6B). Thus the inclination angle between the base dock 11 and the spindle motor 10 also changes.

Figure 7:
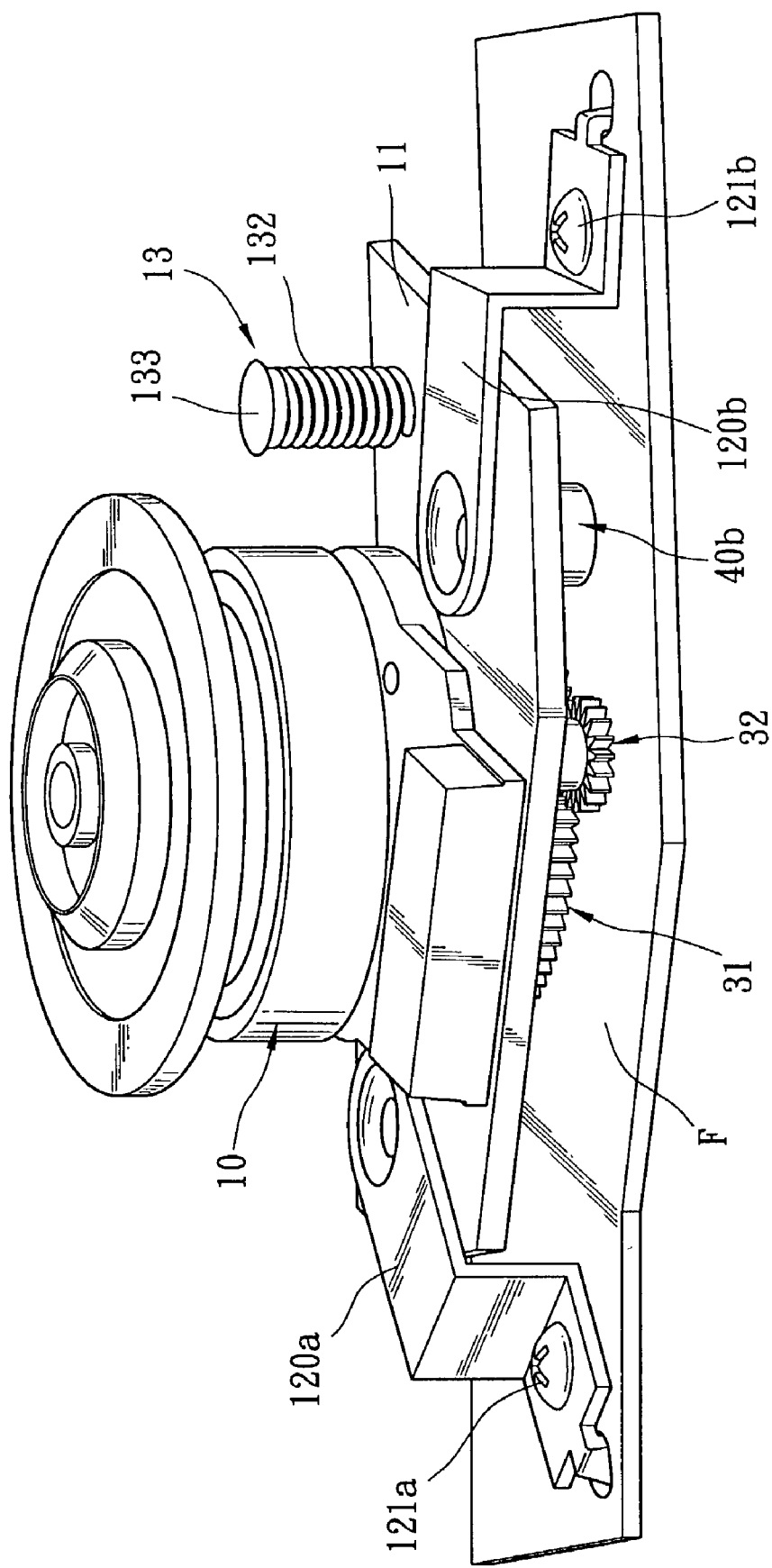
FIG. 7 is a schematic view of the first embodiment in use.

Referring to FIG. 7, the base dock 11 has a plurality of pre-pressing means, including a first pre-pressing means 12a and a second pre-pressing means 12b of the same type, and a third pre-pressing means 13. The first pre-pressing means 12a includes a first elastic blade 120a and a first fastener 121a, while the second pre-pressing means 12b includes a second elastic blade 120b and a second fastener 121b. The first and the second pre-pressing means 12a and 12b have respectively one end fastened by the first and the second fasteners 121a and 121b to the frame F of the optical disk device. The fasteners 121a and 121b may be screws (as shown in the drawing) or the like. The other end of the elastic blades 120a and 120b is pressed on the surface of the base dock 11. The third pre-pressing means 13 is a pin 131 coupled with a spring 132 (a compression spring or the like). The pin 131 has a top end 133. The pin 131 runs through the spring 132 and the base dock 11 with the bottom end thereof fastened to the frame F. The top end 133 of the pin 131 compresses and deforms the spring 132 to generate an elastic force to press down the base dock 11.

The pre-pressing means 12a, 12b and 13 exert the desired pressure at three different points of the base dock 11. The three points are not located on the same straight line so that the pre-pressing means 12a, 12b and 13 can press the base dock 11 with an even force to put the base dock 11 in contact with the inclination angle adjusting mechanism A and maintain an interactive relationship between them.

In order to prevent the base dock 11 from moving on the X-Y coordinate plane while adjusting the inclination angle, there are a plurality of anchor elements 40a and 40b located on the surface of the frame F. The anchor elements 40a and 40b have jutting bolts 401a and 401b formed on their top ends to engage respectively with anchor holes 14a and 14b formed on corresponding locations of the base dock 11. The anchor holes 14a and 14b are preferably located at the positions where the first and the second pre-pressing elements 12a and 12b apply their force. By means of the two anchor elements 40a and 40b, and the pin of the third pre-pressing means 13, the base dock 11 may be prevented from moving on the X-Y coordinate plane.

In the embodiment set forth above, the first and the second pre-pressing means 12a and 12b, and the third pre-pressing means 13 apply pressure on the base dock 11 at three different locations to enable the base dock 11 to constantly maintain contact with the three support points 21a, 21b and 22, and prevent the base dock 11 from moving on the X-Y coordinate plane. It is to be noted that the first and the second pre-pressing means 12a and 12b, and the third pre-pressing means 13 mentioned above serve only as an example, and should not be deemed as the sole design of the invention.

Figure 8:
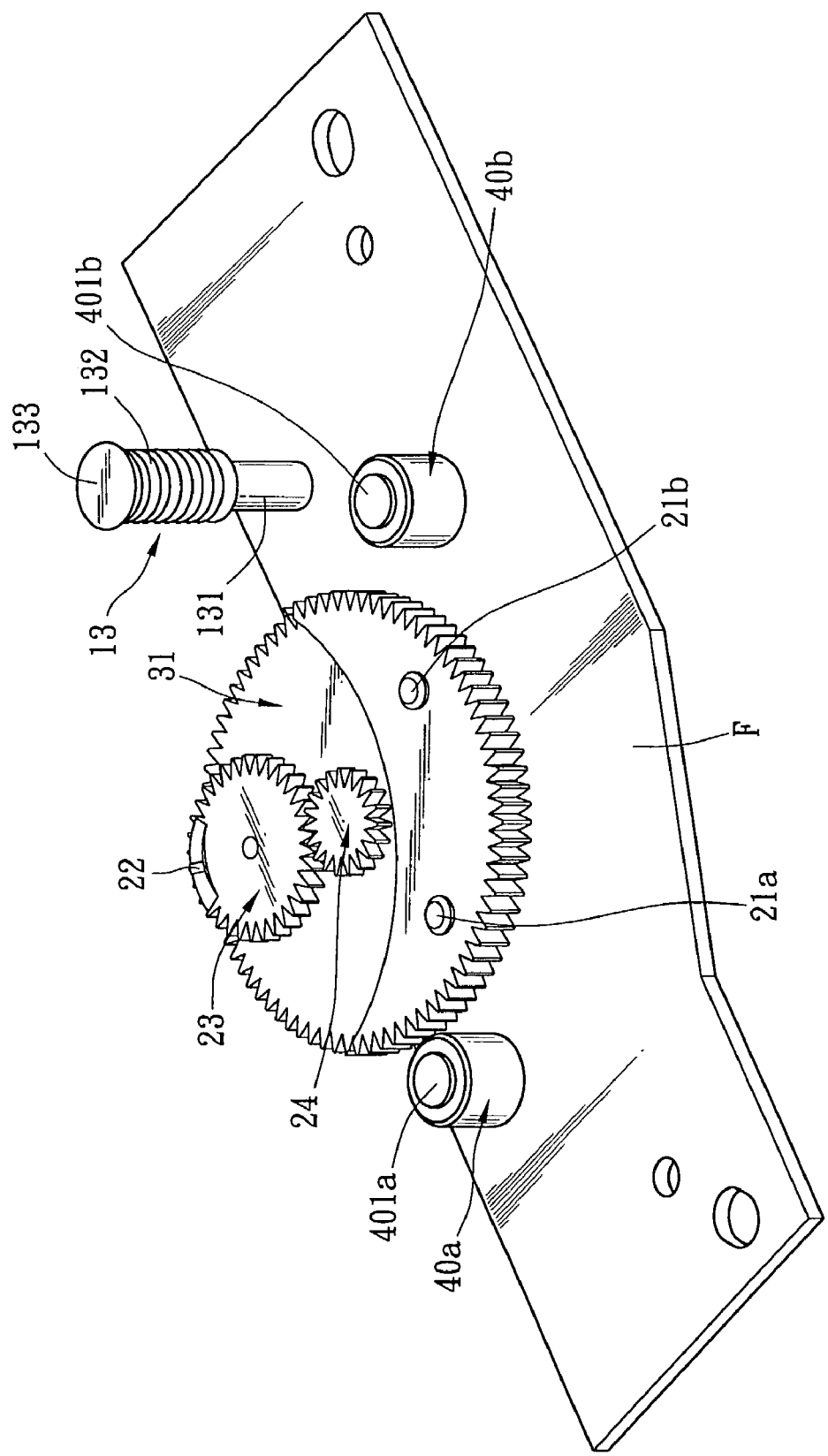
FIG. 8 is an exploded view of a second embodiment of the invention.

Second Embodiment:

FIG. 8 illustrates another embodiment of the invention, which is based on the construction shown in FIG. 4. However, the second adjusting mechanism has only one first rotary element 31 and is not driven by a second rotary element 32 as that shown in FIG. 4. The first rotary element 31 may be turned by pushing with a finger.

Once the spindle motor inclination angle is adjusted by means of the invention, it is preferable to bond and fix the movable elements of the first adjusting mechanism and the second adjusting mechanism with adhesive to prevent loosening.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A spindle motor inclination angle adjusting mechanism for an optical disk device for adjusting the inclination angle of a base dock of a spindle motor, comprising:
   a second adjusting mechanism having a first rotary element which has a hollow rotation shaft pivotally located on a frame of the optical disk device;
   a first adjusting mechanism including a driven rotary element, a main driving rotary element to drive the driven rotary element to rotate and three support points that are not on a same straight line, two of the support points being fixed on a surface of the first rotary element of the second adjusting mechanism, the third support point being located on an eccentric position of a rotary plane of the driven rotary element and having a height different from that of the other two support points, the driven rotary element being pivotally located at an eccentric position of a rotary plane of the first rotary element, the main driving rotary element having a rotary shaft housed in the hollow rotation shaft of the first rotary element, the rotary shaft having one end exposed outside to form a first fast connection head; and
   a plurality of pre-pressing means include at least a first pre-pressing means, a second pre-pressing means and a third pre-pressing means located on the frame of the optical disk device, each of the pre-pressing means having an elastic element to press on the base dock of the spindle motor to make the base dock in contact with the three support points.

2. The spindle motor inclination angle adjusting mechanism of claim 1, wherein the second adjusting mechanism further includes a second rotary element which has a main shaft pivotally located on the frame of the optical disk device to drive the first rotary element to rotate, the main shaft of the second rotary element having one end exposed outside to form a second fast connection head.

3. The spindle motor inclination angle adjusting mechanism of claim 2, wherein the first rotary element and the second rotary element are spur gears.

4. The spindle motor inclination angle adjusting mechanism of claim 2, wherein the second fast connection head is selected from the group consisting of a hexagonal socket or a cross groove socket.

5. The spindle motor inclination angle adjusting mechanism of claim 1, wherein the first fast connection head is selected from the group consisting of a hexagonal socket or a cross groove socket.

6. The spindle motor inclination angle adjusting mechanism of claim 1, wherein the main driving rotary element and the driven rotary element of the first adjusting mechanism are spur gears.

7. The spindle motor inclination angle adjusting mechanism of claim 1, wherein the height of the third support point is greater than the height of the other two support points.

8. The spindle motor inclination angle adjusting mechanism of claim 1, wherein the three support points are located at eccentric positions spaced from the rotation center of the first rotary element.

9. The spindle motor inclination angle adjusting mechanism of claim 1, wherein the three pre-pressing means press the base dock at three locations which are not on a same straight line.

10. The spindle motor inclination angle adjusting mechanism of claim 1, wherein the first pre-pressing means and the second pre-pressing means have respectively an elastic blade and a fastener, the elastic blade having one end fastened to the frame of the optical disk device by the fastener, and the other end pressed on the surface of the base dock.

11. The spindle motor inclination angle adjusting mechanism of claim 10 further having two anchor elements located respectively beneath the two pressing spots of the first pre-pressing means and the second pre-pressing means, each anchor element having a top end with a jutting bolt located thereon to engage with an anchor hole formed on a corresponding location of the base dock.

12. The spindle motor inclination angle adjusting mechanism of claim 1, wherein the third pre-pressing means includes a pin and a spring, the pin having a top end, the pin running through the spring and the base dock and having a bottom end fastened to the frame of the optical disk device such that the top end compressing the spring to press down the base dock.

13. The spindle motor inclination angle adjusting mechanism of claim 12, wherein the spring is a compression spring.

* * * * *